Oct. 8, 1968   D. W. ROWELL   3,404,967

TWO-HOLE EXTRUSION

Original Filed June 24, 1965

INVENTOR.
DOUGLAS W. ROWELL

BY
Pennie, Edmonds, Morton, Taylor & Adams
ATTORNEYS

United States Patent Office 3,404,967
Patented Oct. 8, 1968

3,404,967
TWO-HOLE EXTRUSION
Douglas W. Rowell, Woodbury, Conn., assignor to Anaconda American Brass Company, a corporation of Connecticut
Original application June 24, 1965, Ser. No. 466,717, now Patent No. 3,347,079, dated Oct. 17, 1967. Divided and this application July 11, 1967, Ser. No. 662,237
4 Claims. (Cl. 29—183)

ABSTRACT OF THE DISCLOSURE

An elongated extruded metal having two holes extending longitudinallly is characterized by a unitary structure which is welded between the holes but is free from welds throughout the remainder of the structure and the welded portion is free from contamination.

Cross reference to related application

This is a division of co-pending application, Ser. No. 466,717, filed June 24, 1965, now Patent No. 3,347,079.

This invention relates to the extrusion of metal members having at least two longitudinal holes therein, and more particularly it relates to the extrusion of such members such that they are welded between holes and are free from welds externally of said holes, with the welded portion being substantially free from contamination.

Elongated metal members having at least two longitudinal holes therein, such as copper bars having a generally rectangular cross section with two longitudinal channels for water cooling which are used as hollow conductors in steam turbine plants, are in considerable commercial demand. The most economical manner of manufacturing these elongated members is by extrusion techniques. In extruding these members it is necessary to provide some means for supporting mandrels within the die opening in order to form the longitudinal holes during extrusion. During extrusion the metal is caused to flow around the mandrel supporting structure in several separate streams which must again unite and weld together before the extrusion issues from the die. This has been accomplished successfully for many years with aluminum alloys by using what are known as bridge dies and antichamber dies. Since the billet is necessarily hot, oxidation of the surfaces of the new streams within the die cannot be prevented entirely and the resulting oxide coating on the metal interferes with rewelding. This problem is not prohibitive with aluminum alloys because a thin oxide film forms instantly and this film being relatively impermeable to oxygen does not thicken appreciably; thus, when the streams come tightly together again continued flow through the die ruptures the film at many places and a satisfactory metal-to-metal weld is usually obtained.

With copper alloys, the surface film thickens continuously for two primary reasons: first, the oxidic film formed on the copper alloys is permeable to oxygen and therefore continuously thickens, and secondly the extrusion temperature is about 300 to 400° C. higher than that of aluminum. Upon reuniting the several streams some rewelding takes place but there is so much oxide in the joint that it is neither strong nor tight.

The elongated extruded metal member is characterized by a unitary structure extrusion having at least two elongated holes extending longitudinally therethrough; the metal is welded between the holes and is free from welds externally from said holes with the metal at the welded portion being substantially free from contamination.

The "weld" which is effected by the invention comprises a localized union of similar streams of metal which have never been exposed to a source of contamination during extrusion and reunite substantially free from any separations or cracks between the streams of metal.

A preferred embodiment of the invention is described hereinbelow with reference to the drawings wherein.

The apparatus shown is particularly designed for the extrusion of two-hole rectangular conductors which can be copper or copper alloys, or aluminum. The basic extrusion apparatus is standard and consists of an extrusion ram 10 which is hydraulically operated and of generally cylindrical configuration with an inside diameter appreciably greater than the inside diameter of a fixed mandrel 11 about which it is axially movable during extrusion. The mandrel 11 is also of generally cylindrical configuration and it too is hydraulically movable to a fixed position in relationship to a die where it is maintained fixed during extrusion. A container 12 defines the billet chamber and is adjacent the outlet end of the container and is positioned at a die block 13 which maintains a die in fixed relationship to the container at the outlet end thereof.

Figure 1:
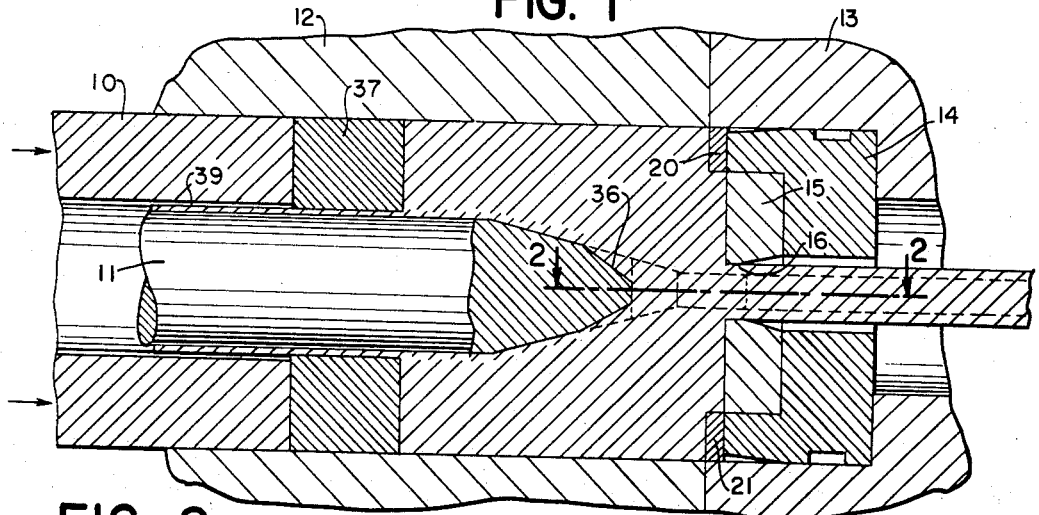
FIG. 1 is longitudinal side elevation predominantly in cross section and taken substantially along the lines 1—1 of FIG. 2.
Figure 2:
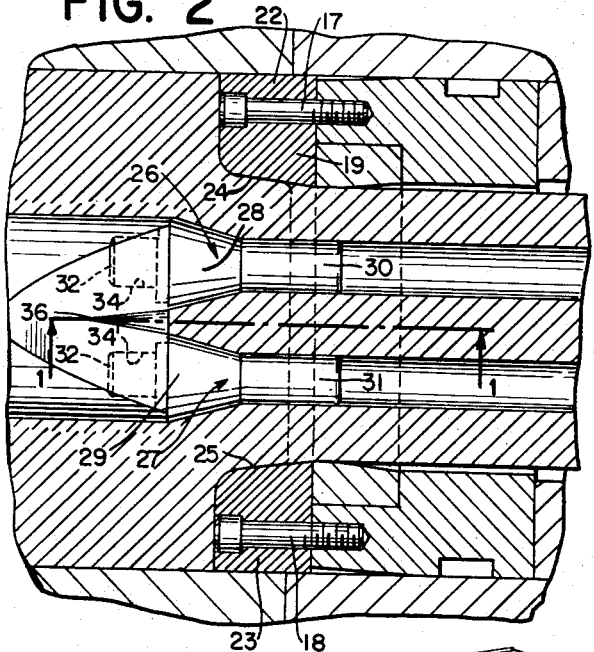
FIG. 2 is a section taken substantially along lines 2—2 of FIG. 1.

Positioned within the die block is a generally cylindrical die holder 14 which is set in a shoulder of a die block against longitudinal displacement in the direction of extrusion. The die holder 14 holds a die 15 properly positioned at the outlet end of the container. In this example the die defines a generally rectangular die opening 16 so as to define the shape of the extruded section. Attached to the die holder 14 by means of diametrically spaced bolts 17 and 18 is a pillow block 19 which is positioned at the outlet end of the container which is a generally annular-shaped member which serves to hold the die fixed to the die holder and assists in guiding the metal flow properly in relationship to the mandrel and die. As shown in FIG. 1 the arcuate top and bottom portions 20 and 21 of the pillow block are of relatively small thickness in relationship to the arcuate side portions 22 and 23 through which the bolts extend as shown in FIG. 2. As shown in FIG. 2 the thicker side portions 22 and 23 converge inwardly and form converging die faces 24 and 25 which serve to guide the metal flow inwardly toward the mandrel.

Fixed to the endmost portion of mandrel 11 are a pair of laterally spaced nibs 26 and 27. These nibs have frustroconical portions 28 and 29 adjacent the end of mandrel 11 and cylindrical portions 30 and 31 which are positioned within the die 15 and define the sides of the longitudinal holes. The frusto-conical portions serve to guide the metal flow in good sliding contact with the cylindrical portions of the nibs. It is the frusto-conical portions of the nibs which adjoin the endmost portion of the mandrel and are attached thereto by means of threaded rearward extensions 32 and 32' which are threaded into a pair of threaded bores 34 and 34' in the endmost portion of the mandrel. Otherwise the nibs are not structurally supported.

At the end portion of the mandrel 11 to which the nibs are fixed, the mandrel end has been reshaped to form two end portions 35 and 35' which progressively converge from the generally cylindrical shape of the mandrel to a diameter of substantially the same size as the frusto-conical portions 26 and 27 of the nibs. There is a further converging and reduction in cross section along an intermediate portion 36 at the endmost portion of the mandrel and between the laterally spaced nibs which serve to cause metal flow between the nibs.

An important member of the apparatus is a dummy block 37 which has an inside diameter slightly larger than the outside diameter of the mandrel.

Figure 3:
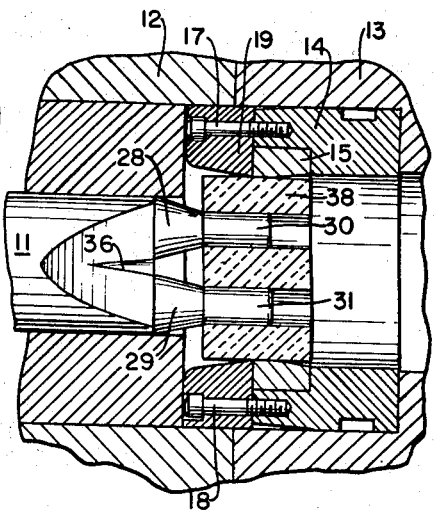
FIG. 3 is a section substantially as shown in FIG. 2 before extruding.

In operation, a pilot block 38, as shown in FIG. 3, is initially positioned on the cylindrical portions 30 and 31 of the nibs 26 and 27. The pilot block is generally of the same rectangular configuration as that to be extruded. It fits on the nibs described and maintains them laterally spaced apart during the initial upsetting of the billet so as to prevent the nibs from being forced together, broken off, or otherwise bent out of their proper position in relationship to the die under the pressure of the initially extruded metal. This block is axially displaceable under the force of the leading edge of the extrusion.

As shown in FIG. 1 when the billet is upset it becomes tightly compressed around the mandrel 11. For this reason a lubricant is usually applied to the mandrel to facilitate removal of the upset metal upon subsequent extrusion. According to the invention, however, no lubricant is used. When the metal contacts the mandrel, the heated metal is usually at a temperature of about 900° C. higher than the temperature of the mandrel, and a portion of the metal immediately in contact with the mandrel freezes. As the extrusion ram is continuously advanced, the dummy block which is of a slightly larger inside diameter than the diameter of the mandrel shears the hot metal longitudinally off of a shell portion 39 of frozen metal which, because there is no lubricant, remains on the fixed mandrel. The hot metal is then extruded around the nibs of the mandrel in such a way that there is no separation of streams of metal and subsequent reuniting of them except between the axially extending nibs. Because the pilot block 38 was used initially, there is sufficient metal flow between the nibs at all times to maintain them properly positioned. Thus, the streams of metal which were split by the mandrel and reunite between the two nibs have never been exposed to any source of contamination and weld together entirely and soundly. The shell portion 39 which remains on the mandrel is removed after each push by withdrawing the mandrel 11.

Figure 4:
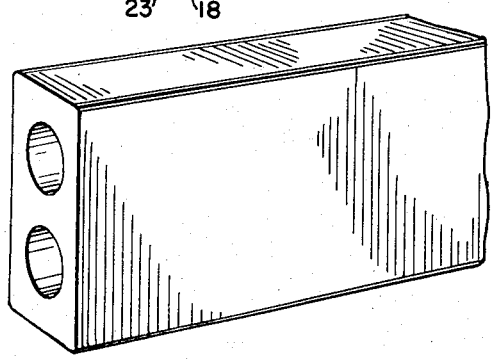
FIG. 4 is a perspective of the elongated extruded member formed by the method and apparatus of the invention.

In one example a 10-inch diameter copper billet 24 inches in length was drilled its full axial length with slightly greater than a 4-inch hole and heated to a temperature of 975° C. The outside diameter of the mandrel 11 was about 4 inches and the inside diameter of the dummy block was 4.135 inches. This left a .067 inch clearance between the mandrel and the dummy to form the copper shell 39. The extrusion formed was rectangular with a 5.5 inch x 1.937 inch rectangular shape and two 1 1/16-inch diameter round holes which were spaced apart 1 1/8 inches and each were spaced 1 1/8 inch from the 5.5-inch dimension. After extrusion a point was machined on the extrusion shape and the extruded shape was drawn to form a finished size of 5 inches x 1.75 inch rectangular shape with two 1-inch holes equally spaced from each other and equally spaced from the 5-inch dimension. This extruded shape is shown in FIG. 4.

I claim:
1. An elongated extruded metal member comprising a unitary structure extrusion having at least two elongated holes extending longitudinally therethrough, said member having a weld between said holes and free from welds externally of said holes, with said metal at said welded portion being substantially free from contamination said weld comprising a localized union of similar streams of metal which have never been exposed to a source of contamination during extrusion and reunite substantially free from any separations or cracks between the streams of metal.

2. An elongated metal member according to claim 1 wherein said metal is copper.

3. An elongated metal member according ot claim 1 wherein said metal is a copper alloy.

4. An elongated extruded metal member comprising a unitary structure extrusion of a generally rectangular cross-sectional shape and having two elongated holes extending longitudinally therethrough spaced laterally relative to the maximum dimension of the extruded section, said member having a weld of joined metal between said holes and otherwise free from welds, with said metal at said welded portion being substantially free from contamination said weld comprising a localized union of similar streams of metal which have never been exposed to a source of contamination during extrusion and reunite substantially free from any separations or cracks between the streams of metal.

References Cited
UNITED STATES PATENTS

| | | | |
|---|---|---|---|
| 1,857,620 | 5/1932 | Brown | 29—193 |
| 2,190,494 | 2/1940 | Templin | 29—180 |
| 2,983,994 | 5/1961 | Johnson | 29—183 |
| 3,135,586 | 6/1964 | Brown et al. | 29—193 |

RICHARD O. DEAN, *Primary Examiner.*